May 12, 1931.  C. A. OTTO  1,805,342
VALVE MOTOR
Filed Oct. 30, 1930
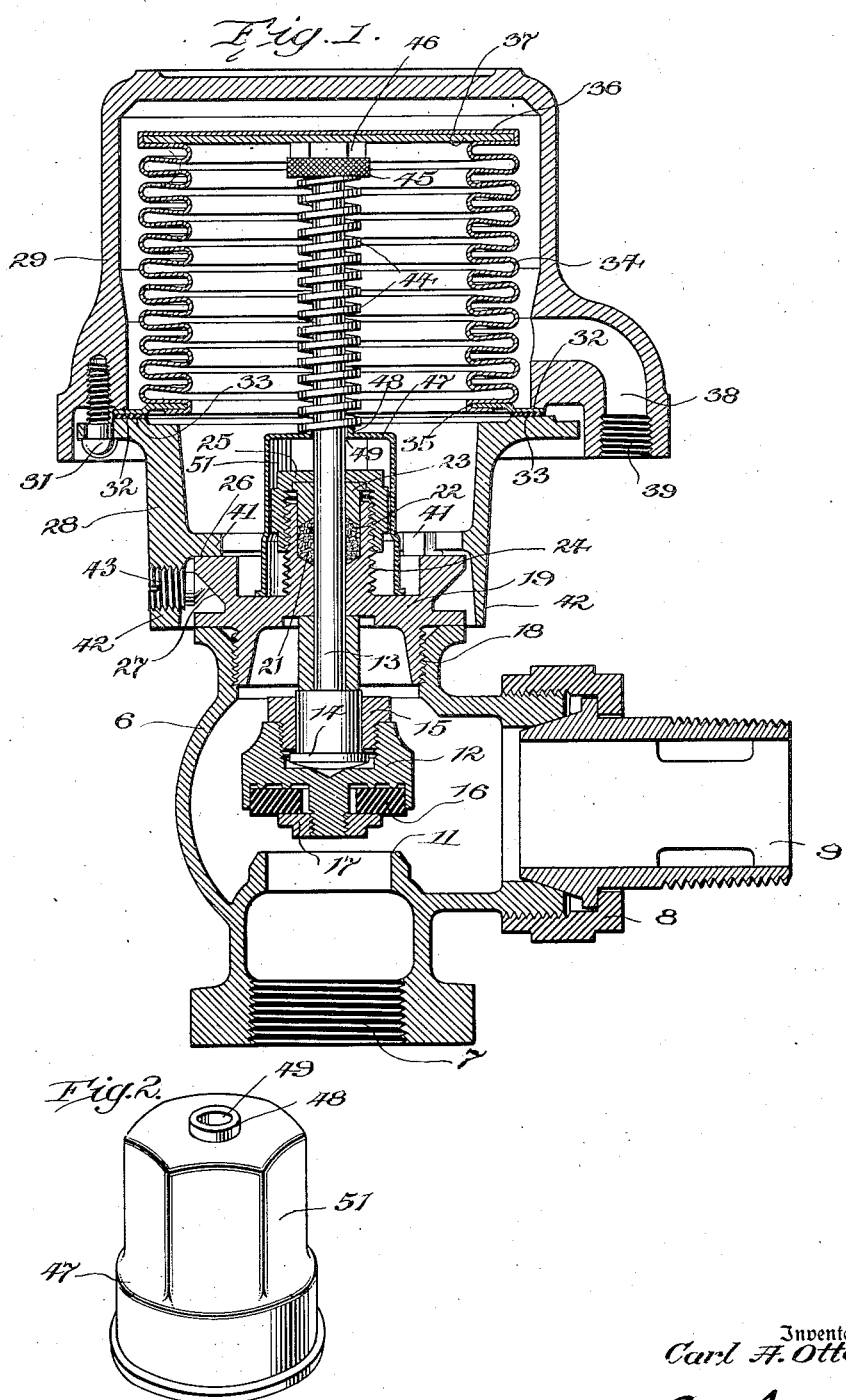
Inventor
Carl A. Otto
By Dodge and Sons
Attorneys Patented May 12, 1931

1,805,342

UNITED STATES PATENT OFFICE

CARL A. OTTO, OF MILWAUKEE, WISCONSIN, ASSIGNOR TO JOHNSON SERVICE COMPANY, OF MILWAUKEE, WISCONSIN, A CORPORATION OF WISCONSIN

VALVE MOTOR

Application filed October 30, 1930. Serial No. 492,323.

This invention relates to motor actuated valves, and particularly to the bellows motor actuated radiator valves used in automatic temperature regulating systems, and the like.

According to the usual practice in this art, the bellows motor is mounted above the valve stem and forces it downward to close or open the valve depending on whether the valve seats downward or upward. Both seating arrangements are known in the art. The downward motion of the valve motor is resisted by a coil spring which surrounds the valve stem and which reacts at its upper end against a spring seat which in some cases is adjustable on the valve stem. At its lower end the spring is customarily seated against the bland nut of the valve. It follows that any adjustment of the gland nut changes the adjustment of the spring.

In the early history of the temperature regulating art, this was not a serious matter, for the thermostats were commonly of the snap-acting type, and functioned to shift the valve from full open to full closed position, and vice versa. Consequently the exact degree to which the spring was stressed did not control. Extensive use in the temperature regulating art is now made of so-called "intermediate" thermostats which function to produce a variable pressure in the radiator valve motor, for the purpose of opening and closing the radiator valves progressively. If such a system is to operate satisfactorily, the adjustment of the springs which oppose the motion of the radiator valve motors, must be accurate and maintained.

The present invention provides a construction in which the gland nut can be adjusted without destroying the adjustment of the spring in question. The desired result is accomplished without change in the construction of existing valves, and, consequently, the invention offers the additional advantage that it may be applied to old as well as new valves. While not confined in its utility to the particular structure illustrated, it is well adapted for use with the valve structure described and claimed in the patent to Otto and Fortier, 1,585,472, issued May 25, 1926, and will be described as so used.

In the accompanying drawings:—

Fig. 1 is a vertical axial section through a complete radiator valve, embodying the invention;

Fig. 2 is a perspective view of the combined spring seat and gland nut adjusting member.

The body of the radiator valve is indicated at 6. It is threaded at 7 to receive the steam supply pipe or the equivalent and has a union connection 8 with a nipple 9 intended to be threaded into the radiator or the equivalent. The valve seat is indicated at 11 and the valve member at 12. The member 12 is swiveled on the stem 13 by means of the head 14 formed on the stem and the ring nut 15 which is screwed into the member 12. The valve member 12 carries on its lower face an annular sealing gasket 16 which is retained by a nut 17, as clearly shown in the drawing.

The particular valve chosen for illustration is of the type which seats downward, closing when the stem 13 is moved downward, as will be readily understood. Radiator valves are constructed in which the seat overhangs the valve and the valve moves upward to close. The invention is equally applicable to this type of valve.

The body 6 supports a combined valve stem guide and motor mount 19 which is threaded into the body at 18. The member 19 is formed with a guideway for the stem 13, and associated with this guideway are the gland 21 which receives the packing 22 and the gland follower 23. The gland 21 is formed in an upper extension of the member 19 which is externally threaded, as indicated at 24, to receive a gland nut 25. The gland nut 25 bears on the follower 23 and compresses the packing 22 in the gland 21 as is usual.

The motor mount includes an annular flange which has an upper face 26 upon which the motor seats, and an undercut conical outer portion 27, as shown in the drawing. The valve motor consists of two parts, a base 28 and a cap 29 which are held together by a series of screws 31. Clamped between the two members 28 and 29 are an annular flange 32 and a sealing gasket 33 which support and seal the bellows motor.

The bellows motor is made up of a metallic corrugated bellows 34 which makes a tight joint at 35 with the flange 32 and which has a closed disk-like head 36 with a reinforcing or stiffening plate 37. The plate 37 reacts against but is not connected to the upper end of the valve stem 13, so that when pressure is admitted to the space above the bellows, the stem 13 will be forced downward, shifting the valve 12 downward.

The pressure fluid which acts against the upper end of the bellows motor is admitted to the housing 29 through the passage 38 which has a threaded connection 39. In practice, a pipe leading from the controlling thermostat is connected at 39 and regulates the pressure which acts upon the bellows motor, but so far as the present invention is concerned, it is immaterial what source of variable pressure be adopted.

The motor housing, made up of the parts 28 and 29, is adjustably mounted on the valve body 6, in the manner described in the Otto and Fortier patent above mentioned. To effect this result the body 28 is provided with inward projecting lugs 41 which seat on the surface 26, and with a skirt 42 which surrounds the undercut surface 27. A plurality of cone pointed clamp screws 43 (preferably three) are threaded in the skirt 42 and engage the surface 27. The effect is to lock the motor in place in any angular adjustment about a vertical axis so that the connection 39 may be located as desired.

To urge the valve stem 13 upward in opposition to the action of the bellows motor, a coil spring is used. This spring is indicated at 44 and seats at its upper end against the adjustable nut 45 which may be clamped by a lock nut 46. As these valves were heretofore constructed, the spring 44 seated at its lower end against the gland nut 45. According to the present invention, the spring 44 seats against a cup-shaped member 47 which is formed with a spring-centering flange 48 encircling the opening 49 through which the stem 13 works. The member 47 seats and turns on the member 19 which alone supports it against the spring thrust. The side walls of the member 47 are given a hexagonal configuration, as indicated at 51, and fit rather closely around the gland nut 25, which is hereunderstood to be of hexagonal cross section. Obviously, the member 47 might be variously shaped to fit nuts of different configuration. Whatever the number of sides or the particular configuration may be, the member 47 embraces the nut 25 in such a way that a wrench may be applied to the member 47 with the same effect on the nut 25 as if the wrench were applied directly to the nut itself. To all intents and purposes, the structure provides a swiveled member 47 which acts as a seat for the spring 44, and which has a splined engagement with the nut 25, so that the nut may be turned by rotation of the member 47.

To adjust the gland nut, all that is necessary to do is to disconnect the pipe 39, back out the screws 43 and lift the motor unit off the mount 19. This will expose the member 47 which may be turned with a wrench to adjust the gland nut 25. Rotation of the member 47 does not affect the adjustment of the spring 44, and it is consequently unnecessary to make any compensatory adjustment of the nut 45. In such devices as heretofore usually constructed, adjustment of the gland nut 25 would require a compensatory adjustment of the spring seat 45, an adjustment which it is very difficult to make precisely.

What is claimed is:—

1. As a new article of manufacture, a combined spring seat and gland nut adjusting member for motor actuated valves, comprising a cup-like body adapted to embrace and turn with the nut without partaking of its axial motion, and having a spring seat formed thereon.

2. The combination with a valve having a packing gland with adjusting nut, and a motor for actuating said valve, of a combined spring seat and gland nut adjusting member adapted to embrace said nut and turn therewith without partaking of its axial motion, said member being formed with a seat for said spring.

3. The combination of a valve body having a valve seat; a valve coacting with said seat; a stem for actuating said valve; a packing gland for said stem; an adjusting nut associated with said gland; a valve motor for actuating said stem in one direction; a spring urging said stem in the opposite direction; and a member interposed between said body and said spring and resisting the thrust of the latter, said member embracing said gland nut and turning therewith.

4. The combination of a valve body having a valve seat; a valve coacting with said seat; a stem for actuating said valve; a packing gland for said stem; an adjusting nut associated with said gland; a valve motor for actuating said stem in one direction; a spring urging said stem in the opposite direction; and a member interposed between said body and said spring and resisting the thrust of the latter, said member embracing said gland nut and turning therewith, and said member being provided with flats to receive a wrench.

5. The combination of a valve body having a valve seat; a valve coacting with said seat; a stem for actuating said valve; a packing gland for said stem; an adjusting nut associated with said gland; a valve motor for actuating said stem in one direction; a spring urging said stem in the opposite direction; a flat circular resilient ring fitting within said raised side, the inner diameter of the lower edge of the resilient ring being greater than the inner diameter of its upper edge and an abutment on its inner side extending around its side wall, said abutment being adapted to bear against said resilient ring when the cover is positioned on a container, to force a portion of said ring above and below said abutment whereby a seal is formed between said side wall and the enclosed portion of said container both above and below said abutment.

6. A new article of manufacture, a cover for a container comprising a stiff cap having a raised side wall, a resilient flat circular ring fitted within said side wall having an outward flare, said side wall being positioned substantially parallel to the enclosed wall portion of the container and having an abutment on the inner side thereof and extending therearound, said abutment adapted to bear against said resilient ring whereby a portion of said resilient ring is forced above and below said abutment forming a seal between said side wall and the enclosed portion of a container both above and below said abutment, and a turned in lower edge on said side wall adapted to hold said resilient ring in place.

7. In a cover for a container, having a side wall substantially parallel to the enclosed portion of the side wall of a container, an outwardly flaring resilient material within said side wall and an inwardly projecting preformed groove extending around said wall and bearing against said resilient material when said cover is positioned on said container whereby a portion of said resilient material is forced above and below said abutment forming a seal between said side wall and the enclosed portion of a container.

8. A new article of manufacture, a cover for a container comprising a stiff cap having a side wall adapted to lie substantially parallel to the enclosed portion of said container, said side wall having an inwardly extending inflexible annular bead, a resilient flat sided ring adapted to lie within said side wall, said bead being adapted to bear against and imbed in said resilient ring when the cover is positioned on said container whereby a portion of said resilient ring is forced to flow along the enclosed portion of the container wall thereby forming a seal above, below and at the bead between the side wall and the enclosed portion of the container.

9. A new article of manufacture, a cover for a container comprising a stiff cap having a side wall adapted to lie substantially parallel to the enclosed portion of said container, said side wall having an inwardly extending inflexible annular bead whereby the inner diameter of the cover is smaller at the bead than at the top or bottom of the side wall, a resilient flat sided ring adapted to lie within said side wall, said bead being adapted to bear against and imbed in said resilient ring when the cover is positioned on said container whereby a portion of said resilient ring is forced to flow along the enclosed portion of the container wall thereby forming a seal above, below and at the bead between the side wall and the enclosed portion of the container.

In testimony whereof, I have signed my name to this specification this ninth day of April, 1929.

ROBERT C. EUWER.